(12) United States Patent (10) Patent No.: US 8,414,463 B2
Andersen (45) Date of Patent: Apr. 9, 2013

(54) ANVIL DEVICE FOR A FITMENT APPLICATOR

(76) Inventor: Stein Vidar Andersen, Hokksund (NO)

( * ) Notice: Subject to any disclaimer, the term of this patent is extended or adjusted under 35 U.S.C. 154(b) by 0 days.

(21) Appl. No.: 12/598,367

(22) PCT Filed: May 2, 2008

(86) PCT No.: PCT/NO2008/000156
§ 371 (c)(1),
(2), (4) Date: Dec. 9, 2009

(87) PCT Pub. No.: WO2008/136683
PCT Pub. Date: Nov. 13, 2008

(65) Prior Publication Data
US 2010/0115885 A1 May 13, 2010

(30) Foreign Application Priority Data
May 3, 2007 (NO) .................................. 2007 2291

(51) Int. Cl.
*B65B 61/18* (2006.01)

(52) U.S. Cl. ....... 493/114; 493/105; 493/471; 53/133.1; 53/133.3

(58) Field of Classification Search .................. 493/105, 493/107, 114, 388, 471, 475, 478; 53/133.1, 53/133.3
See application file for complete search history.

(56) References Cited

U.S. PATENT DOCUMENTS

| 3,505,494 | A | * | 4/1970 | Reutschi | .......................... 219/98 |
| 4,678,457 | A | * | 7/1987 | Slobodkin | ...................... 493/355 |
| 5,040,357 | A | | 8/1991 | Ingemann et al. | |
| 5,964,685 | A | | 10/1999 | Boland | |
| 5,964,687 | A | | 10/1999 | Rogalski et al. | |
| 5,983,599 | A | * | 11/1999 | Krueger | .......................... 53/410 |
| 6,085,489 | A | * | 7/2000 | Bachner et al. | ................. 53/410 |
| 6,321,813 | B1 | * | 11/2001 | Miyajima et al. | .............. 156/497 |
| 7,568,607 | B2 | * | 8/2009 | Adler | ......................... 228/110.1 |
| 8,104,250 | B2 | * | 1/2012 | Abrahamsen et al. | .......... 53/410 |
| 2002/0103064 | A1 | * | 8/2002 | Kondo et al. | ................... 493/70 |
| 2003/0062665 | A1 | | 4/2003 | Urlaub | |

FOREIGN PATENT DOCUMENTS

| NO | 20024913 A | 4/2003 |
| WO | WO-2004/058574 | 7/2004 |
| WO | WO 2010029308 A1 * | 3/2010 |

OTHER PUBLICATIONS

Hall, Anette, "International Search Report for PCT/NO2008/000156" as mailed Aug. 22, 2008, (4 pages).

* cited by examiner

*Primary Examiner* — Hemant M Desai
(74) *Attorney, Agent, or Firm* — Winstead PC

(57) ABSTRACT

An anvil device (1) for a fitment applicator is described, where the anvil device (1) includes one or more arms (2), where each arm is equipped with a carrier (5) for the positioning of a closure (22) against a contact surface (6) for co-operation with a welding head (21) during fixation of a closure to a cartoon, where the carrier (5) and the contact surface (6) are aligned on a contact device (4) which is adjustably fastened to the anvil device (1).

11 Claims, 3 Drawing Sheets

ANVIL DEVICE FOR A FITMENT APPLICATOR

FIELD OF THE INVENTION

The present invention relates to an adjustable contact device for an anvil device for a closure applicator.

DESCRIPTION OF PRIOR ART

Closure applicators for the fastening of closures to cartons, such as pouring pouches with a card, are well known, for example, from U.S. Pat. No. 5,964,687 and NO 2002 4913, the descriptions of which are incorporated in their entirety as references in the present application.

In the above mentioned publications, the fitting of closures to cartons containing beverages is described. The cartons are led into the closure applicator while they are still open at the top and a hole is punched out at a predetermined spot where the closure is to be fastened. The closure normally comprises a cylinder-formed, threaded closure which, at the one end, has a top screwed on and an outwardly extending flange at the other end. The closure which is placed on a peg on a rotating anvil wheel, is led down into an open carton and the closure with the top is led through the punched out opening in the carton so that the flange lies against the inside of the opening. A welding head, such as an ultrasonic horn, is thereafter led towards the surface of the carton around the opening of same, the anvil wheel and sealing head are forced against each other so that the flange of the seal and the carton around the opening of the carton are forced together at the same time as the welding head supplies energy in the form of ultrasound. The combination of pressure and ultrasound melts the surface of the flange and the plastic covered inside of the carton so that the seal is fastened to the carton.

A well known problem with such closure applicators is that the arrangement of welding head/heads in relation to the anvil is very critical. The material in the collar which is to be welded to the carton is very thin and even the smallest inaccuracy in the installation leads to the pressure and heating of the collar not being evenly distributed around the whole of the closure. The result of this is a leaking weld between closure and carton, something which is not acceptable. A difference of just a few µm from the one side of the closure to the diametrically opposite side can result in unacceptable results for the welding.

It is also important that the arm of the anvil wheel that lies against the inside of the closure and which acts as a counter-balance to the sealing head, lies steadily and firmly against the closure so that the ultrasound energy from the sealing head is focused at the interface between the collar of the closure and the carton. The anvil wheel is therefore manufactured in one part so that no vibrations and displacements will arise with a consequent loss of energy between separate parts of the head. Thus, the manufacture of the anvil head requires precision.

The setting up of an anvil, and especially a rotating anvil head, in relation to the welding head/heads on today's equipment also requires precision and is very time consuming. For example, it can take a person skilled in the art a whole day to set up such a rotating anvil head with the welding heads. Such an arrangement must take place at the installation of the machine and at replacement of equipment. In addition to that such a set up is necessary at the fitting of an installation, use and wear of the equipment can also result in the anvil head and/or welding heads coming out of position. One aim of the present invention is therefore a method and a device that simplifies arranging anvils in relation to welding heads on machines for insertion of closures to cartons. It is also an aim to be able to reduce the time taken and thus costs that are connected with the setting up of closures.

SUMMING UP THE INVENTION

The above aim is reached by an anvil device for a closure applicator, where the anvil device comprises one or more arms, where a carrier is fitted on each arm for positioning of a closure against a contact surface for cooperation with a welding head during the fastening of the closure to a carton, where the carrier and the contact surface are set up on a contact device which is fastened to the anvil device so that it can be regulated. In that the carrier and contact surface are arranged on a contact device, which is fastened to the anvil device so that it can be regulated, the individual contact surface, with the carrier, can be regulated individually on each individual arm, something which much simplifies the setting up of the contact surface against a cooperating welding head.

According to one embodiment, a ball shell formed surface is arranged on the contact device to lie against a corresponding ball shell formed surface on the anvil device. In that the contact surfaces between the contact device and the anvil device are ball shell formed, it will be possible to adjust the contact device with respect to the anvil device without the interface changing in form or size, and also that it is ensured that the surfaces are actually lying against each other. Furthermore, the fact that the interface between these two parts is a ball surface ensures that the parts are free to move in relation to each other within certain limits, without that the interface results in some adjustments of the contact device being favoured in relation to each other because of the interface. This makes it possible with a self-adjustment of the contact device in relation to the welding head. For self-adjustment, the welding held is placed against the contact surface. The contact body will then adjust itself so that the force with which the welding head presses on the contact surface will be equal around the circumference of the contact surface. The operator can then fasten the contact body in relation to the anvil device and the installation of this contact surface is completed.

The ball shell shaped surface of the contact device is convex according to one embodiment, and that the corresponding ball shell formed surface is concave.

According to one embodiment, a bolt is arranged in a boring in the contact device for the fastening of the contact device to the anvil device. The bolt makes it possible to fix or secure the contact device in the wanted position, preferably the position which is set up by the self-adjustment as described above.

According to one embodiment, the bolt has a ball shell formed underside which is adapted to cooperate with a corresponding ball shell shaped recess in the anvil device. Such a configuration of the head of the bolt and the corresponding recess in the anvil device will prevent the anvil device being pulled away from the position set up when the anvil device is fixed in its position with the help of the bolt.

According to an alternative embodiment, the ball shell formed surface on the contact device is concave and that the corresponding ball shell formed surface is convex.

According to an embodiment, the anvil device is an anvil wheel with two or more arms where the contact device is arranged on the arms. Such an anvil wheel is especially preferred for use in rotating closure applicators.

SHORT DESCRIPTION OF THE FIGURES

DETAILED DESCRIPTION OF THE PRESENT INVENTION

Figure 1:
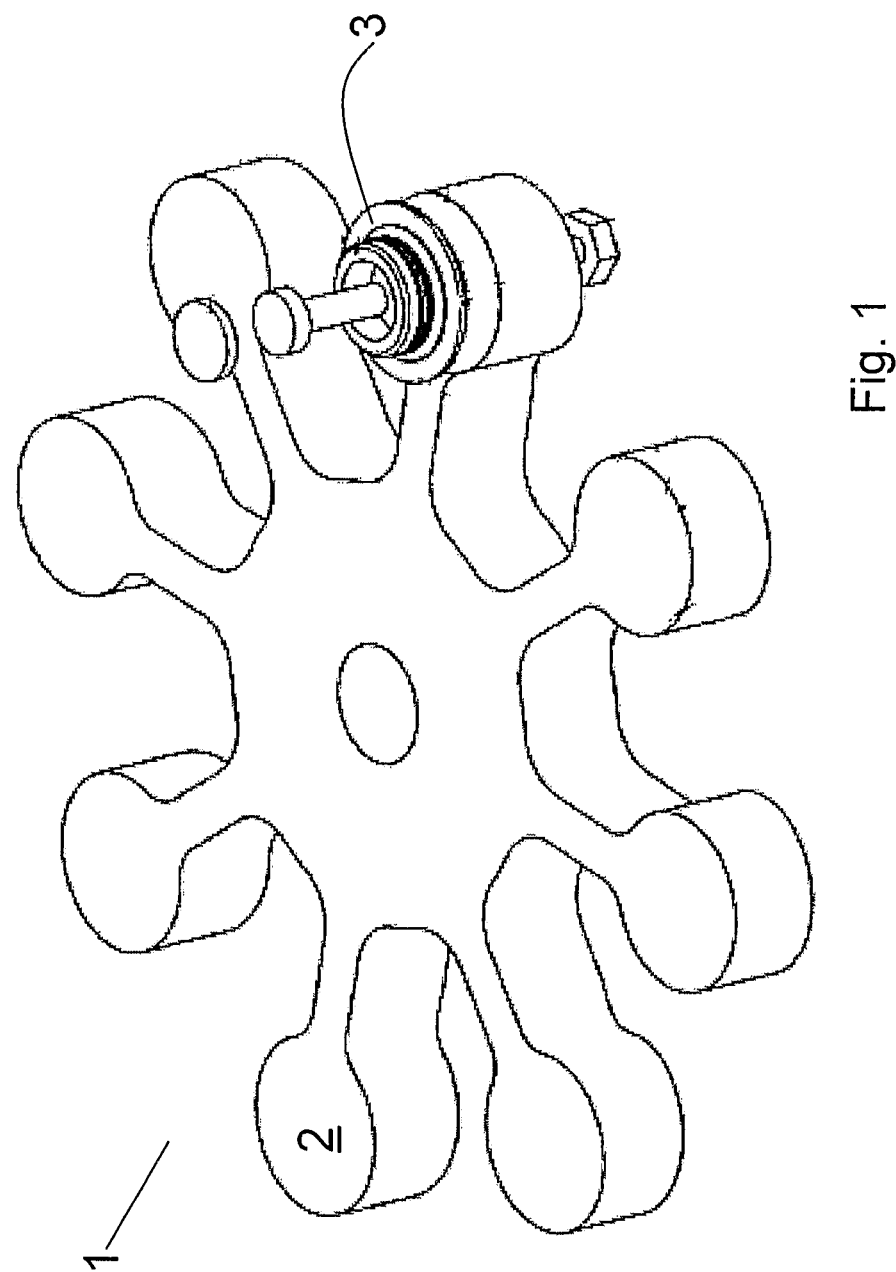
FIG. 1 shows a perspective outline of a rotating anvil wheel where a contact device is divided up into its individual parts.
Figure 2:
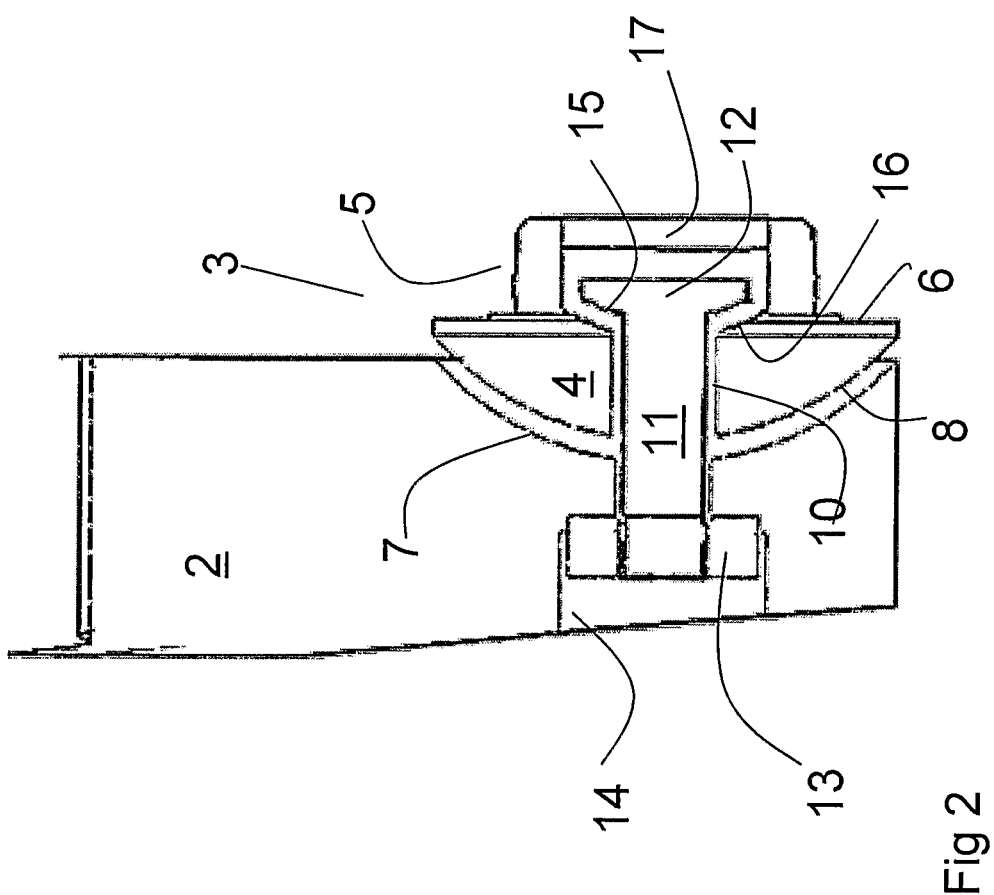
FIG. 2 shows a section through an arm of an anvil wheel with an anvil according to the present invention.

FIG. 1 shows an anvil device in the form of an anvil wheel 1 according to the present invention, with several arms 2 for a rotating fitting device for closures for cartons. The anvil wheel distinguishes itself from known anvil wheels in that adjustable contact devices 3 with pegs 5 are arranged on the arms 2 of the anvil wheel.

FIG. 1 shows only a contact device 3 which is partially divided into individual parts shown arranged on one of the arms 2. Although the figure only shows one contact device 3 on one of the arms 2, there will normally be contact devices 3 on each arm 2.

The contact device 3 comprises a basic body 4 that forms a plane, and normally a circular, contact surface 6. A cylindrically formed peg 5 is arranged perpendicular to the contact surface with its axis through the centre of the contact surface 6. The contact device 3 is fixed to the anvil wheel such that the longitudinal axis of the pegs 5 runs, in the main, in parallel with the rotational axis of the anvil wheel and such that the pegs protrude out of the rotational plane of the anvil wheel.

The part of the contact device 3 that lies against the anvil wheel forms a convex surface 7 to lie against a corresponding concave surface 8 on the anvil wheel 1. The convex surface 7 and the concave surface 8 are both ball shell formed with equal diameter and a common centre. A boring 10 is arranged axially through the peg 5 and through the basic body 4 so that it comes out approximately in the centre of the convex surface 7. Furthermore, the bore runs, in the main, through the centre of the concave surface 8 and through the anvil wheel 1. A bolt 11, the head 12 of which is sunk into the top of the bolt 5, goes through the boring 10 and is fixed with a nut 13 on the back of the anvil wheel 1, possibly in a boring 14 in the wheel.

The head of the bolt 11 has an underside 15 which, in the main, is convex and lies against a concave surface 16 in the peg 5. The convex underside 15 of the head of the bolt 11 and the concave surface 16 are also ball shell formed and adapted to each other and both have a common centre which, in the main, merges with the centres of the surfaces 7 and 8.

When the head of the anvil 1 and those on the arranged contact devices 3 are to be set up, the nut 13 is loosened and the welding head is pressed against the contact surface 6. The contact device 3 can then be moved in relation to the welding head, and will itself adjust and cancel out any differences in the pressure between different parts of the contact surface and the surface of the welding head. The nut 13 is tightened again, and the pressure between the welding head and the anvil device is cancelled. Thereafter, one can arrange the next contact device, and continue until all contact devices have been set up.

The nut 13 is shown as an ordinary nut, but self-locking nuts, an additional contra-nut or glue or any other initiatives or means to fix the nut can also be used to fix the nut so that it does not unintentionally become unscrewed during operation.

The ball formed convex and concave cooperating surfaces 7, 8 and 15,16, respectively, will ensure that the nut device and the anvil head are self-adjusting and that the shape of the interface will not in itself lead to a slanted arrangement or prevent the arrangement. It is also important that there is some play between the bolt 11 and the boring 10 to permit a certain movement during the setting up.

A cover 17 is appropriately arranged on top of the peg 5 to cover the head of the bolt during operation of the sealing applicator.

Other solutions can also be imagined to give a self-adjusting contact device. For example, the surfaces 15, 16 can be replaced by corresponding concave and convex surfaces in the fastening of the nut 13. However, this requires an intermediate disc having a convex surface against a concave surface on the anvil wheel and gives a more complicated construction with more parts. In addition, a solution where a concave surface on the contact device lies against a convex surface on the anvil wheel can also be considered. However, the solution described above is presently the most preferred as it provides the simplest and most compact solution.

Figure 3:
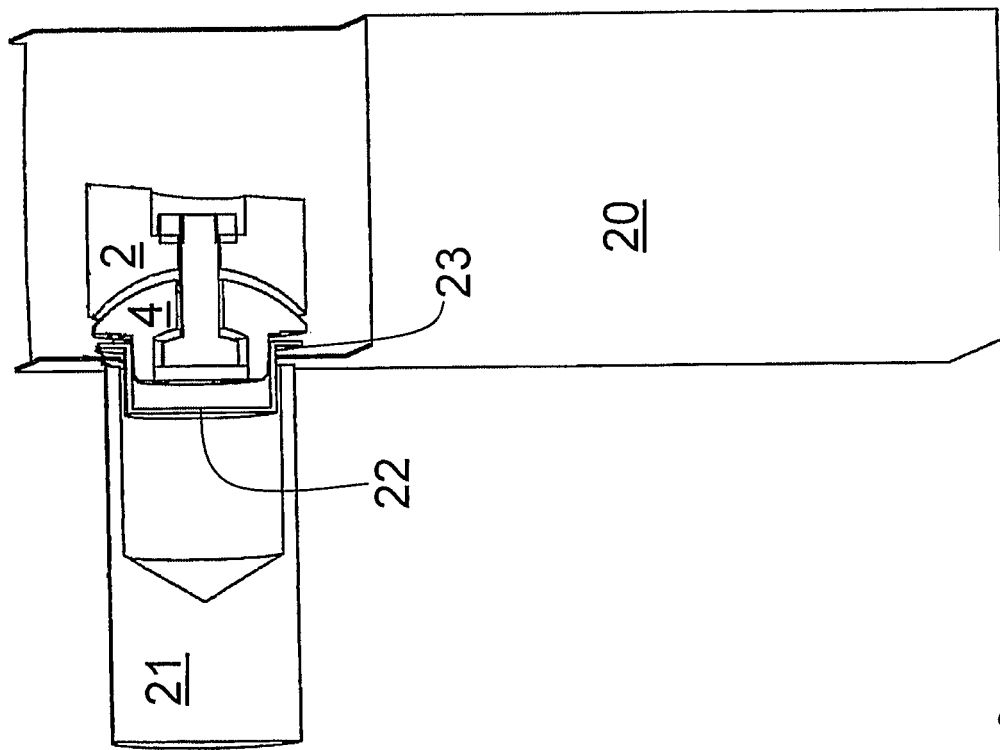
FIG. 3 shows a section through an arm of an anvil wheel with a contact device according to the present invention and a welding head in welding position for fitting of a closure on a carton.

FIG. 3 shows a partially cut through drinking carton 20 where an arm 2 of the anvil wheel 1 with a contact device is in welding position, i.e. so that the peg 5 with a seal 22 is arranged through the punched out opening in the carton 20. A welding head 21, here an ultrasonic welding head, is also shown in welding position where the carton which surrounds the punched out opening in the carton and the flange 23 on the seal are pressed together with the welding head and the contact surface 6 on the contact device 4.

When using the ultrasonic welding head it is essential that the contact device 4 rests with a large surface against the arm of the anvil wheel 2 so that no vibrations can arise between these parts which can absorb vibration energy. Absorption of vibration energy in this joining will reduce the energy which is necessary to carry out the welding between the flange of the seal and the carton. This will increase welding time, reduce the quality of the welding and/or make it necessary to add more energy in the form of ultrasound. Such absorption of vibration energy will also lead to unwanted heat production in the contact device and in the arm 2 of the anvil head and can make cooling of these necessary.

To avoid absorption of energy in the join between the arm 2 and the contact device 4, it is important that these have a good contact over a relatively large surface. Two adjusted ball surfaces give both the possibility for adjusting of the anvil device in relation to the arm, at the same time as the surfaces have a large surface contact which is not altered by such adjustments. It is desirable that this contact surface is approximately as large as or larger than the area defined by the circumference of the flange of the seal.

The embodiment that is described with reference to the figures all refers to an anvil device which is in the form of an anvil wheel for a rotating closure device. However, the present invention can also be used for other anvil devices with other configurations. The embodiment shown above also shows a carrier in the form of a peg (5). This carrier can also have another configuration, as the essential part is that the carrier shall hold the closure securely while the anvil device and the carton on which the closure shall be placed are brought into mutual correct position with respect to each other. Thus, the carrier normally comprises an element for positioning of the seal in relation to the contact surface, and also an element for temporary retention of the closure until this is fastened to the carton. With the use of a peg which is adapted to engage with the closure, the peg as a carrier can fulfil both these functions. Alternatively, the closure can, for example, be held securely with the help of a vacuum.

The invention claimed is:

1. An anvil device comprising:
    an arm;
    a contact device coupled to the arm, the contact device comprising:
        a contact surface; and
        a carrier disposed on the contact surface; and
    wherein a position of the contact device relative to the arm is adjustable during an anvil-device set up with a welding head and the position is not adjustable during an ultrasonic welding operation subsequent to the anvil-device set up; and
    wherein a first ball shell formed surface is arranged on the contact device to engage a corresponding second ball shell formed surface on the arm.

2. The anvil device according to claim 1, wherein the first ball shell formed surface is convex and the corresponding second ball shell formed surface is concave.

3. The anvil device according to claim 1, comprising a bolt disposed through the contact device and the arm for coupling the contact device to the arm.

4. The anvil device according to claim 3, wherein:
    the bolt comprises a head;
    the head comprises a ball shell formed underside; and
    the ball shell formed underside is adapted to cooperate with a corresponding ball shell formed recess formed in the contact device.

5. The anvil device according to claim 1, wherein the first ball shell formed surface is concave and the corresponding second ball shell formed surface is convex.

6. The anvil device according to claim 5, comprising a bolt disposed through the contact device and the arm for coupling the contact device to the arm.

7. The anvil device according to claim 6, wherein:
    the bolt comprises a head;
    the head comprises a ball shell formed underside; and
    the ball shell formed underside is adapted to cooperate with a corresponding ball shell formed recess formed in the contact device.

8. The anvil device according to claim 1, wherein:
    the anvil device comprises a second arm; and
    a second contact device is coupled to the second arm.

9. The anvil device according to claim 8, wherein the arm and the at least one second arm are disposed around a rotational axis and form at least part of an anvil wheel.

10. An anvil device comprising:
    an arm comprising a concave surface;
    a contact device comprising:
        a body comprising a convex surface for engagement with the concave surface;
        a contact surface formed on the body; and
        a carrier disposed on the contact surface;
    a bolt disposed through the contact device and the arm for coupling the contact device to the arm;
    wherein interaction of the concave surface with the convex surface facilitates positional adjustment of the contact device relative to the arm during an anvil-device set up with a welding head; and
    wherein there is no positional adjustment of the contact device relative to the arm during an ultrasonic welding operation subsequent to the anvil-device set up.

11. The anvil device of claim 10, wherein the generally-planar contact surface and the body are integral.

* * * * *

UNITED STATES PATENT AND TRADEMARK OFFICE
CERTIFICATE OF CORRECTION

PATENT NO. : 8,414,463 B2  
APPLICATION NO. : 12/598367  
DATED : April 9, 2013  
INVENTOR(S) : Stein Vidar Andersen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 358 days.

Signed and Sealed this  
Second Day of July, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,414,463 B2  
APPLICATION NO. : 12/598367  
DATED : April 9, 2013  
INVENTOR(S) : Stein Vidar Andersen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 553 days.

Signed and Sealed this
First Day of September, 2015

Michelle K. Lee
*Director of the United States Patent and Trademark Office*